UNITED STATES PATENT OFFICE.

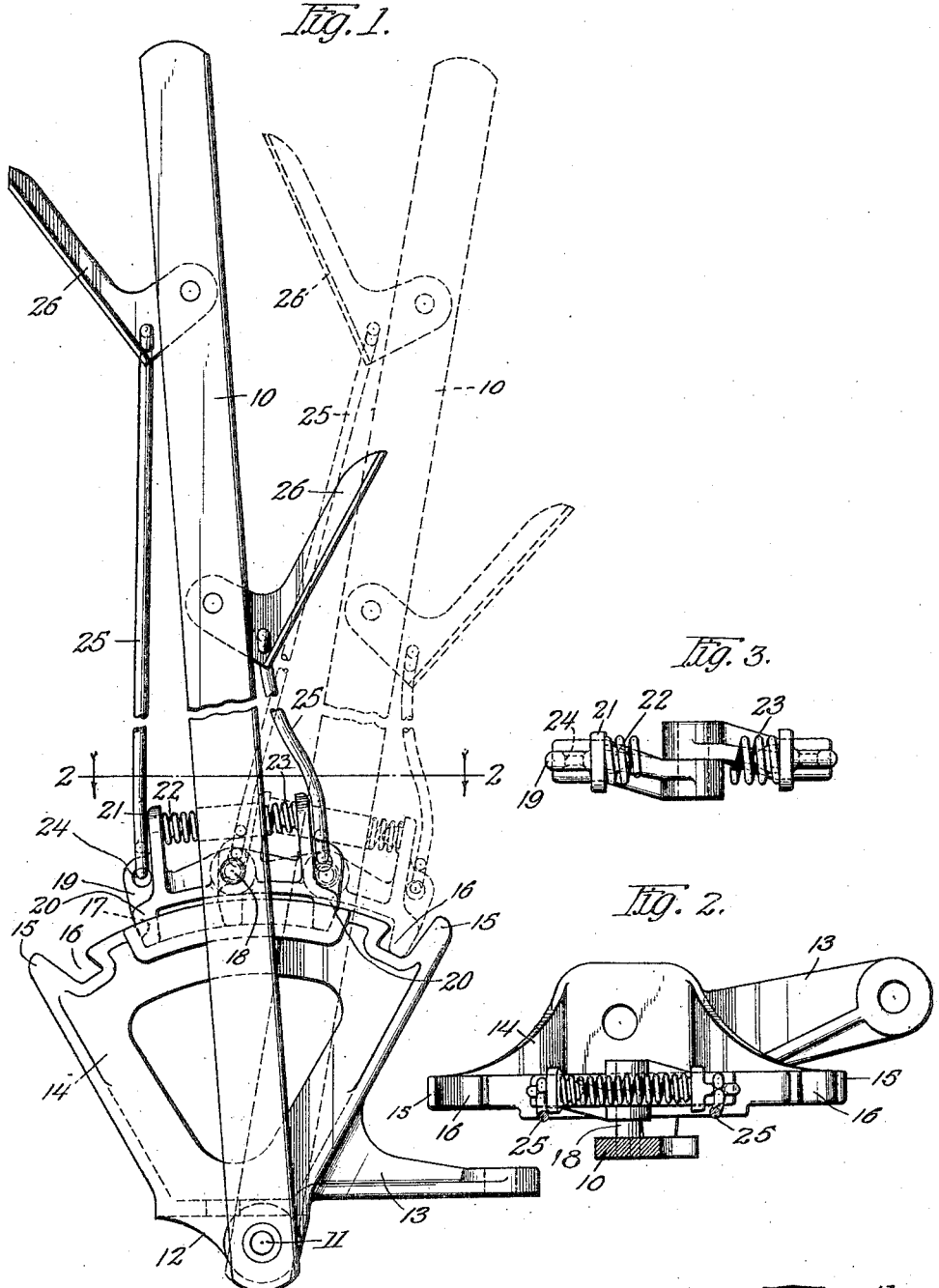

CHARLES A. A. RAND, OF CHICAGO, ILLINOIS, ASSIGNOR TO INTERNATIONAL HARVESTER COMPANY, A CORPORATION OF NEW JERSEY.

SAFETY-LOCK FOR LEVERS.

1,400,909. Specification of Letters Patent. Patented Dec. 20, 1921.

Application filed March 28, 1919. Serial No. 285,722.

*To all whom it may concern:*

Be it known that I, CHARLES A. A. RAND, a citizen of the United States, residing at Chicago, in the county of Cook and State of Illinois, have invented certain new and useful Improvements in Safety-Locks for Levers, of which the following is a full, clear, and exact specification.

This invention relates to levers.

The use of levers and lever mechanism to shift gears and to shift the driving connections for rotating elements of machines from one direction of rotation to the reverse direction of rotation, and to change the driving speeds, is common in all arts. When the direction of rotation of moving elements is changed by levers there is always a tendency to change directly from one direction of movement or rotation to the opposite direction. This practice is very injurious to the gearing and the driving connections, especially when the speed of rotation is changed as well as the direction of rotation, and also when the rotating element or elements have a considerable amount of momentum.

An example of the change in speed and also in direction of rotation of the rotating element, is found in machines such as the combined side delivery rake and tedder, where the rake is rotated in one direction to rake the hay and is rotated in the opposite direction and at a greater speed for tedding.

Having the above difficulties in mind, the present invention has for its object to prevent injury to driving connections or gearing by the direct change from a rotation in one direction to rotation in the opposite direction.

In the drawing illustrating one embodiment of my invention,—

Figure 1 is a front elevation of my improved lever construction, two positions of the lever being shown;

Fig. 2 is a top plan view of the sector on which the lever is pivoted taken substantially on line 2—2 of Fig. 1; and Fig. 3 is an enlarged detail view showing in plan the lever controlling pawls.

The lever 10 in connection with which my invention is illustrated, is mounted on a pivot pin 11 carried by a downwardly extending lug 12 preferably formed integral with a bracket 13. The bracket 13 is secured in any suitable manner to the machine frame in connection with which the lever is used, and is provided with an upwardly extending quadrant or sector 14. This quadrant has formed thereon at its opposite ends upwardly extending lugs 15, and is provided intermediate these lugs and adjacent thereto with notches 16, the purpose of which will be hereinafter described.

The central portion of the upper surface of the quadrant is provided with an elongated notch 17 which extends to a considerable distance each side of the center of the quadrant. The lever 10 has secured thereto in a position slightly above the center of the quadrant an outwardly projecting pin 18 on which are mounted two oppositely disposed pawls 19. Each of these pawls is provided at one end with a transverse aperture through which the pivot pin 18 extends, and the pawls are offset from this pivotal portion at their outer ends in such a manner that the outer ends of the pawls are disposed substantially in alinement with each other, as is illustrated in Figs. 2 and 3. Each of the pawls has formed thereon a downwardly extending lug 20, and these lugs are adapted to seat in the elongated notch 17 when the lever is in its central position. The pawls also have formed thereon upwardly extending lugs 21, each of which has a laterally extending lug 22 formed thereon. A spring 23 engages the lugs 22 as shown in Fig. 1 of the drawings, and tends to force each of the pawls downwardly about its pivot. Intermediate the lugs 20 and 21 the pawls are provided with web portions apertured as shown at 24. These apertures receive the lower looped ends of links 25 by means of which the pawls are connected to pawl-operating members or levers 26 which are pivoted to the main lever 10.

Having described the construction of my improved lever, I will now outline briefly the method of operating this lever.

In the central position of the lever as shown in full lines in Fig. 1, both of the pawls 19 have their lugs 20 seated in the elongated notch 17 of the sector 14. Before the lever can be moved in either direction, therefore, one of the pawls 19 must be lifted on pivot 18 by means of its operating member 26. Assuming that the operator desires to move the lever in a clockwise direction, the right-hand pawl will be lifted by means of its pawl-operating member 26, and the lever may then be thrown to the position shown in dotted lines in Fig. 1. The limit of movement in this direction is reached when the lug 20 of the right-hand pawl strikes the upwardly extending right-hand lug 15 carried by the sector, and the lug 20 of the right-hand pawl will then drop into the right-hand notch 16 of the sector. The left-hand pawl will still be seated in the elongated notch 17 as shown in dotted lines in Fig. 1, and when the operator desires to change the direction of rotation, or the speed of rotation of the elements controlled by the lever, he moves the lever 10 toward the left or in an anti-clockwise direction. Should the operator carelessly try to throw immediately into a reverse direction, or rotation, or a changed speed of rotation, the engagement of the lug 20 of the left-hand pawl with the left-hand end of the elongated notch 17, would prevent such a movement of the lever. Therefore, before the lever 20 can be thrown to the left-hand extreme position where it is assumed that the direction of rotation is reversed or the speed of rotation is changed by the lever, he must lift the left-hand pawl by means of the pawl-operating member 26. After this has been done the lever can be thrown to the left-hand extreme position of movement, and the right-hand pawl will be in engagement with the elongated notch 17.

From the above description it will be readily seen that the use of this improved construction will prevent the careless manipulation of the lever to shift gears or accomplish any other desired function.

It will be understood that the lever 10 may be connected in any desired manner to suitable clutch controlling or gear shifting mechanism. An inspection of the construction illustrated will immediately disclose the simplicity of the construction which includes a minimum number of parts and is so devised that it may be readily attached to any type of lever construction. It should be noted that both of the pawls are mounted on a single pin and that a single spring is used to actuate these pawls.

While I have shown and described but a single embodiment of my invention, it is to be understood that the invention is capable of modification. Changes therefore in the construction and arrangement of parts may be made without departing from the spirit and scope of the invention as defined in the following claims.

1. In combination, a sector, a lever pivoted to move along the sector, means connected to the lever and coöperating with the sector to limit movement of the lever to one half of the sector, and means connected to the lever and coöperating with the sector to limit movement of the lever to the other half of the sector.

2. In combination, a sector, a pivoted lever adapted to move along the sector, a pair of locking means carried by the lever and adapted to engage the sector to prevent movement of the lever, one of the locking means when released permitting movement of the lever in both directions along one part of the sector and the other locking means when released permitting movement of the lever in both directions along another part of the sector.

3. In combination, a sector, a pivoted lever adapted to move along the sector, a pair of locking means carried by the lever and adapted to engage the sector to prevent movement of the lever, and independent means for disengaging the respective locking means from the sector, one of the locking means when released permitting movement of the lever along one part of the sector and the other locking means when released permitting movement of the lever along another part of the sector.

4. In combination, a sector, a pivoted lever adapted to move along the sector, and independently operated controlling means carried by the lever and coöperating with the sector to control the movement of the lever over different parts of the sector.

5. In combination, a sector, a pivoted lever adapted to swing along the sector, a plurality of pawls carried by the lever and engaging the sector, independent means for operating the pawls, each pawl limiting movement of the lever to one part of the sector and adapted to lock the lever in one of its extreme positions.

6. In combination, a sector, a lever movable across said sector, said sector having an elongated notch therein, and means carried by said lever and adapted to engage said notch for preventing the movement of said lever from one extreme position on said sector to the opposite extreme position on said sector.

7. In combination, a sector having an elongated notch therein, a lever movable across said sector and having a plurality of members adapted to engage said notch and to prevent the movement of said lever with respect to said sector.

8. In combination, a sector, a lever movable across said sector, and means including a plurality of pawls carried by said lever for preventing the movement of said lever from one extreme position with respect to said sector to the opposite extreme position.

9. In combination, a sector, a lever, said sector having a plurality of notches, a plurality of pawls pivoted on said lever on a single pivot and adapted to engage the notches in said sector, single means for forcing said pawls into engagement with said sector, and independent means for lifting said pawls out of engagement with said sector.

10. In combination, a sector having an elongated notch therein, a lever movable across said sector, and a pair of pawls pivoted on said lever, the distance between the outer surfaces of said pawls being substantially equal to the length of said elongated notch.

11. In combination, a sector having notches therein adjacent its outer ends and having an elongated central notch, a lever movable across said sector, a pair of pawls pivoted on said lever and adapted to engage said notches, said pawls being so constructed and arranged that when one of said pawls engages one of the outer notches the opposite pawl will engage the central elongated notch.

12. In combination, a sector having an elongated notch therein, a lever movable across said sector and provided with a pair of pawls adapted in one position of movement of said lever to engage the end walls of said elongated notch.

13. In combination, a sector having notches adjacent the outer ends thereof and a central elongated notch, a lever movable across said sector and provided with a pair of pawls mounted on a single pivot, single means engaging said pawls for forcing said pawls into engagement with said notches, and separate means for withdrawing said pawls from engagement with said notches.

In testimony whereof I affix my signature.

CHARLES A. A. RAND.